United States Patent [19]

Thornton, Jr. et al.

[11] Patent Number: 4,988,114

[45] Date of Patent: Jan. 29, 1991

[54] REMOTELY OPERATED WHEELCHAIR FOOTREST MOVING DEVICE

[76] Inventors: Harold C. Thornton, Jr., 131 Athens Rd.; Joseph W. Miller, 129 Newport Rd., both of Oak Ridge,, Tenn. 37830; Bruce E. Wilson, Rte. 3, Box 1496, Lakeawana, Loudon, Tenn. 37774; James D. Wolfenbarger, 8112 Hill Rd., Knoxville, Tenn. 37983

[21] Appl. No.: 442,009

[22] Filed: Nov. 28, 1989

[51] Int. Cl.[5] .............................................. B62M 1/14

[52] U.S. Cl. ................................ 280/304.1; 297/429; 297/DIG. 4

[58] Field of Search .......................... 280/304.1, 250.1; 297/429, DIG. 4, 430, 433, 434, 436, 437; 74/491, 523

[56] References Cited

U.S. PATENT DOCUMENTS

| | | | |
|---|---|---|---|
| 2,793,682 | 5/1957 | Duke | 297/433 |
| 2,868,275 | 1/1959 | Mise | 280/304.1 |
| 3,189,385 | 6/1965 | Mommsen | 297/433 |
| 3,854,774 | 12/1974 | Limpach | 297/429 |
| 4,012,074 | 3/1977 | O'Reilly | 297/434 |
| 4,033,624 | 7/1977 | Jun | 297/434 |
| 4,176,879 | 12/1979 | Rodaway | 297/429 |
| 4,486,048 | 12/1984 | Meyer | 297/433 |
| 4,722,572 | 2/1988 | Sata | 297/433 |
| 4,790,553 | 12/1988 | Okamoto | 297/429 |

FOREIGN PATENT DOCUMENTS

| | | | |
|---|---|---|---|
| 1344688 | 1/1974 | United Kingdom | 297/429 |

*Primary Examiner*—David M. Mitchell
*Assistant Examiner*—A. M. Boehler
*Attorney, Agent, or Firm*—Pitts and Brittian

[57] ABSTRACT

A work-engaging member is attached to the wheelchair frame adjacent to the footrest assembly of a wheelchair to cause latching and releasing of the footrest assembly for rotation about a vertical axis. As the work-engaging member is turned by a rotatable means a surface thereon which is spaced from the axis of rotation slidably contacts the footrest assembly to push the footrest assembly latch and causes the footrest assembly to swing to the side of the wheelchair. Rotation of the work-engaging member in the opposite direction causes the device to contact a surface of the footrest assembly thereby laterally urging the footrest assembly around the vertical axis so as to reposition and cause the latching of the footrest assembly into a locked position in front of the wheelchair.

14 Claims, 11 Drawing Sheets

REMOTELY OPERATED WHEELCHAIR FOOTREST MOVING DEVICE

BACKGROUND—FIELD OF INVENTION

This invention relates to wheelchairs and more specifically to remotely repositioning the existing footrest assemblies of wheelchairs.

BACKGROUND—DESCRIPTION OF PRIOR ART

Wheelchair footrest latching and moving devices have been developed that allow the footrest to be moved to and from the front of the wheelchair without removing the footrest assembly from the frame of the wheelchair.

Some wheelchairs are manufactured with footrest assemblies which are capable of being rotated about a vertical axis so as to vacate the area in front of the wheelchair. In many cases the latching device which holds the footrest assembly in its normal position is located well below the user's knee level. For some users this location is inconvenient and could be a health and safety hazard, an example being users who are paralyzed on one side and must lean far forward so that the functional hand can unlatch the footrest on the user's non-functional side putting the user at risk of falling forward out of the wheelchair. For this reason a portion of wheelchairs perform less than satisfactory service for their users.

Known footrest moving devices are capable of being manipulated only by awkward maneuvering and bending of the occupants of the wheelchair. Consequently, they are of very limited utility in applications where it is desirable or necessary to remotely and selectively latch or release the locking mechanism and transmit forces in either rotational direction to cause the desired movement of the wheelchair footrest assembly. Such structure is illustrated for example in U.S. Pat. No. 4,722,522 to Dwight O. Sata entitled "Latch and Release Mechanism for Wheelchair Footrest" is a known wheelchair footrest swing-away device that discloses a latch and rotating device that cannot be operated while the wheelchair user is seated in the wheelchair without bending forward in such a way to be unsafe.

(a) Their devices create safety problems by causing the user to assume an unsafe position for operation.

(b) Wheelchair users that are significantly large in size may be prevented by their own bulk from bending far enough to operate their device.

(c) Their device is not convenient for use by people that may be assisting the user of the wheelchair.

(d) No provision is made for any method of remote operation of their device.

(e) They offer alternative means of operation for their device.

(f) They may expose the user to injury from the pinch points associated with the mechanical components of their device.

It is therefore an object of the present invention to provide a remotely operated device for wheelchair footrest moving capable of selectively latching and releasing the existing wheelchair latching device and rotating the wheelchair footrest to the desired position.

SUMMARY OF THE INVENTION

This device is a new and improved mechanism for the displacement of existing wheelchair footrest assemblies from the normal position in front of the wheelchair seat so the footrest assembly will not hamper efforts of the wheelchair user to stand or otherwise move forward from the sitting position. It also acts, when manipulated by or for the wheelchair user, to engage and return the footrest assembly to the normal position.

(a) Our device provides a safe and convenient method by allowing the user to remain in an upright position for operating the latching device and moving the wheelchair footrest assembly.

(b) With our device wheelchair users that are significantly large in size are permitted to operate the existing wheelchair footrest swing-away assembly safely and conveniently.

(c) Our device is convenient for use by people that may be assisting the user of the wheelchair to operate the existing wheelchair footrest swing-away assembly.

(d) Our device requires no alteration or modification of the wheelchair or wheelchair footrest assembly while providing remote operation of the existing wheelchair footrest swing-away assembly.

(e) Our device allows convenient operation of the existing wheelchair footrest swing-away assembly physically with either hand, or by many other methods for instance electrically, or with a puff and sip switch.

An additional object of the invention is the provision of a securing device configured to easily fasten and remove the wheelchair footrest moving device from the wheelchair frame or footrest assembly.

The use of this invention increases the possibility of safe and convenient use of the footrest assembly thereby providing greater independence for the user.

BRIEF DESCRIPTION OF THE DRAWINGS

The above and other objects and advantages of the present invention will become apparent to those of skill in the art as the same becomes better understood by reference to the following detailed description when considered in conjunction with the accompanying drawings in which.

DETAILED DESCRIPTION OF THE PREFERRED EMBODIMENT

Figure 1:
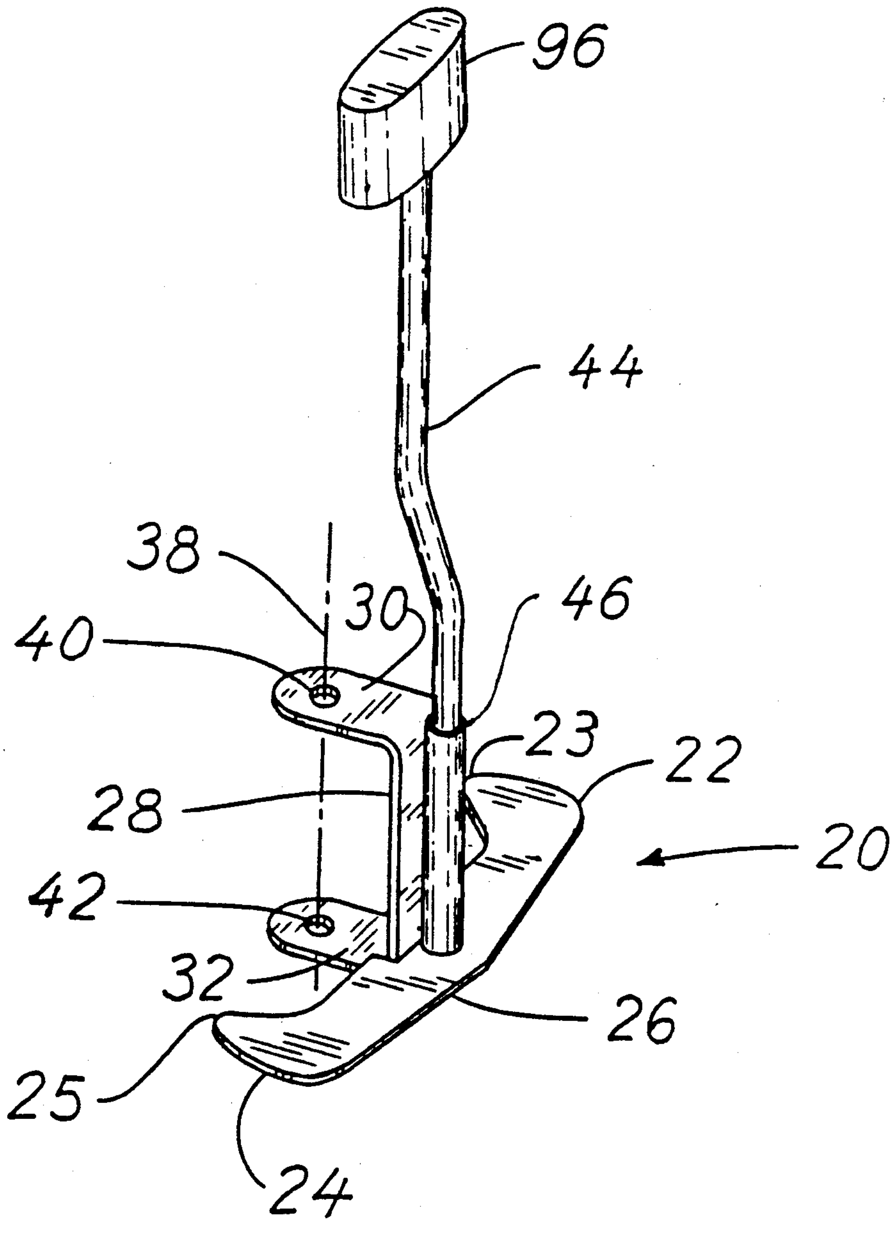
FIG. 1 is a perspective view of a wheelchair footrest moving device illustrating features of a preferred embodiment of the present invention including an assembly with both left and right camming surfaces mounted on a bracket assembly for rotation about an axis and a means for remotely transmitting force for use on either the right or left side of the wheelchair.

Referring now to the drawings in which like reference characters designate like or similar parts throughout the several views, a wheelchair footrest moving device generally designated at 20 is shown incorporating features of the preferred embodiment of the present invention. In general the device 20 includes rotating cams with edge faces 22, 24 supported by an extended structure 26 that is attached to a bracket 28 which includes supporting structures 30 and 32 for the wheelchair footrest assembly attachment posts 34, 35 or 36, 37 that is also the rotational axis 38 and the location of the bore hole 40 and 42 of the wheelchair footrest moving device 20. The device 20 is powered by the rotation of an operation means 44 which is attached to a location 46 parallel to the axis of rotation 38 of the device 20.

To position the wheelchair footrest assembly 48 or 50 in front of the wheelchair 56 force is applied in a rotational manner by the operation means 44 which causes the contact points 58 or 60 (see FIG. 5) on the bracket 28 to cause the wheelchair footrest assembly 48 or 50 to move toward a latched position in front of the wheelchair 56 by pushing on the brackets 62 at contact points 66 of the footrest assembly. Continuously applying force in this manner causes the latching device 70 or 72 to lock the wheelchair footrest assembly 48 or 50 in a normal position in front of the wheelchair 56.

To rotate the wheelchair footrest assembly 48 or 50 from a position in front of the wheelchair 56 to the side of the wheelchair 56 reversal of the direction of force applied to the operation means 44 will cause the device 20 to rotate the camming surface 22 to contact surface 78 on the latching device 70 or 72 causing the latch to open which in turn causes the sliding of the contact surface 78 away from the camming surface 22 or 24 and with continued force causes the wheelchair footrest assembly 48 or 50 to be in position at the side of the wheelchair 56. The wheelchair footrest moving device 20 has a securing device 82 that can have an engaging latch 84 that contacts the wheelchair frame 88 or 89 in the general vicinity of the axis of rotation 38 just under the brackets 90 or 92 and the wheelchair footrest assembly attachment posts 34 or 36 extending from the wheelchair frame 88 or 89. The wheelchair frame 88 or 89 also has attached brackets 94 or 96 and the wheelchair footrest assembly attachment posts 35 or 37 extending from the wheelchair frame 88 or 89. The securing device 82 when necessary will permit the removal of the wheelchair footrest moving device 20" from the wheelchair 56 and the wheelchair footrest assembly 48 or 50. The securing device 82 has an engaging latch 84 and a spring 86.

Figure 2:
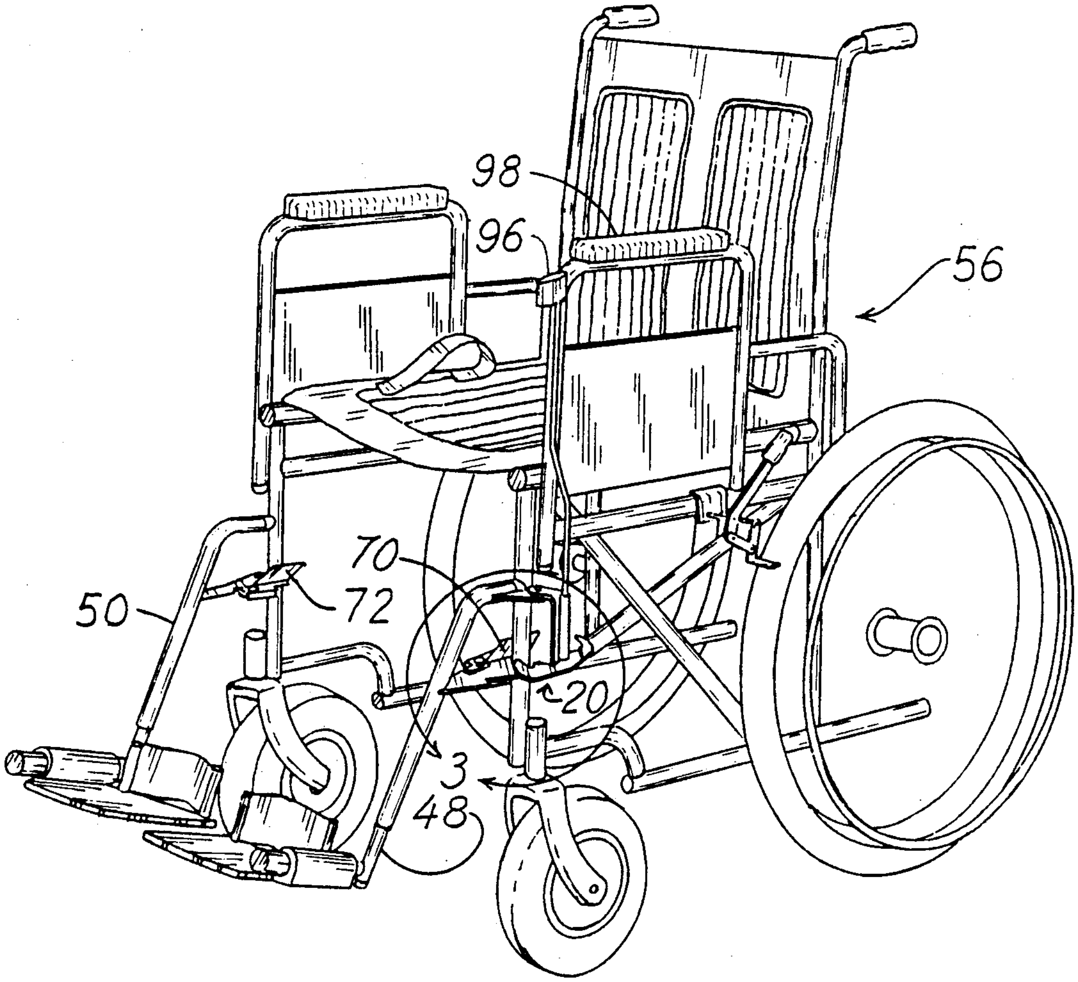
FIG. 2 is a prespective view of the device shown in FIG. 1 attached to a wheelchair frame and footrest assembly.
Figure 3:
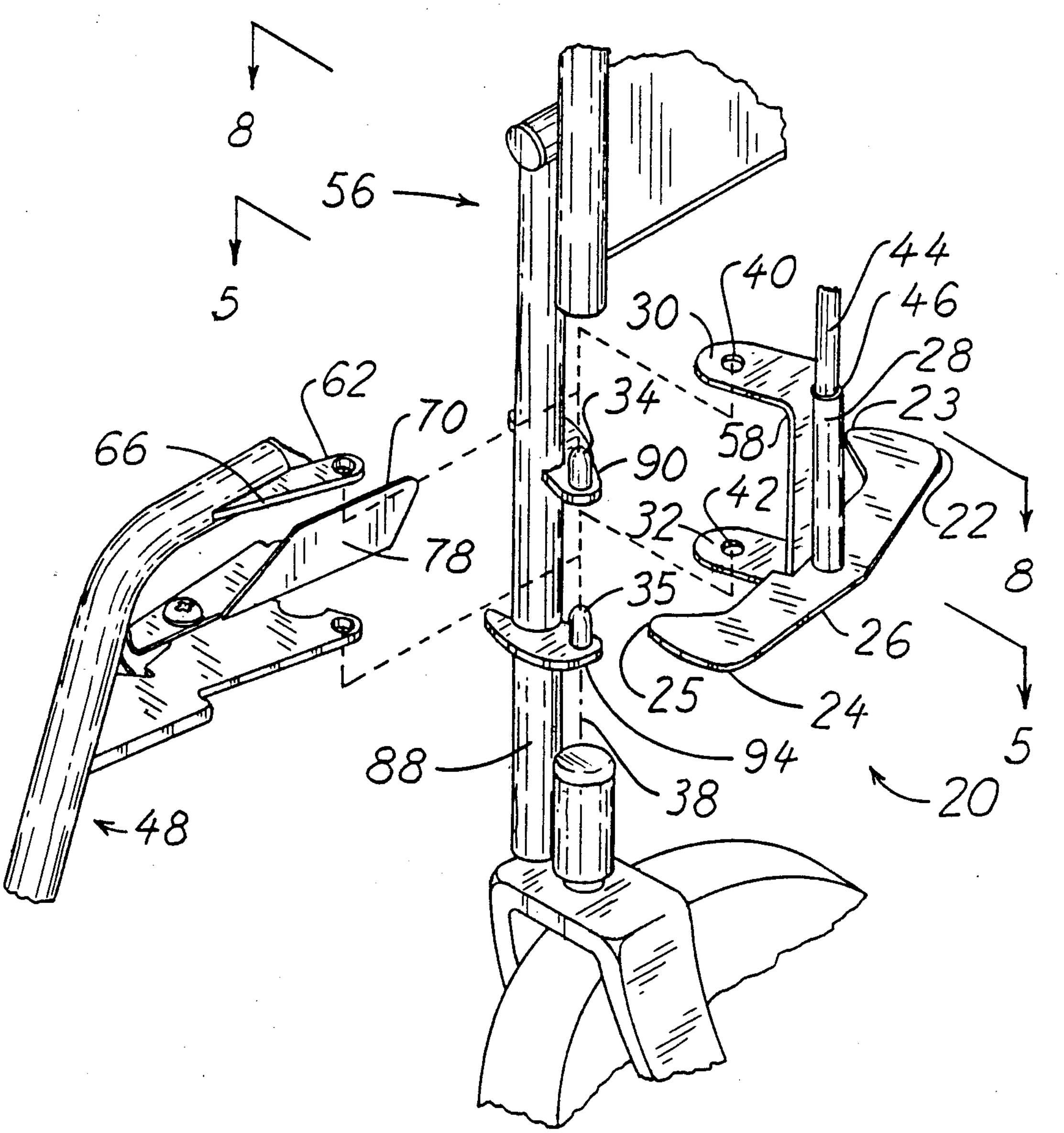
FIG. 3 is an exploded view of the device as shown in FIG. 2 in the detail designated as number 3.

Referring now in particular to FIG. 1 through 3, the wheelchair footrest moving device assembly 20 configured for use on either the left or the right side of the wheelchair includes a member rotating cam 26 having edge faces 22, 24 preferably disposed in a plane that is perpendicular to the axis of rotation. The outer diameter of the camming surface edge face 22 or 24 decreases toward the first end 23 or 25 of the camming surface. The camming surfaces 22 or 24 are supported by an extended structure 26 that is attached to a bracket 28 that is supported by attachment and supporting structures 30 and 32. Structures 30 and 32 have circular bores 40 and 42 for the attachment to the wheelchair footrest assembly attachment posts 34 or 35, which are in turn attached to brackets 90 and 94, and these are attached to the wheelchair frame 88. The rotational axis 38 of the wheelchair footrest moving device 20 is centered on the wheelchair footrest assembly attachment posts 34 or 35. A remote force is applied to the operator means 44 projecting from the bracket 28 at the location of attachment 46 and is disposed with its longitudinal axis parallel with the axis 38 of the device 20 which will cause the operator means 44 to rotate the camming surfaces 22 or 24. This operator means 44 typically terminates at a distal end in a knob or other rotating means 96 that is located proximate the level of an arm rest 98 of the wheelchair (see FIG. 2).

FIG. 2 is a perspective view of the wheelchair 56 with the wheelchair footrest moving device 20 in position on the left side of the wheelchair. The wheelchair footrest assembles 48 and 50 are shown in the forward position in front of the wheelchair 56. The latching devices 70 and 72 are shown in this view. The area of detail in the circle designated at 3 is shown in FIG. 3.

FIG. 3 is an exploded view of the device as shown in a detail of FIG. 2, designated at 3, a view illustrating the sequence and position of attachment of the wheelchair footrest assembly 48 and the wheelchair footrest moving device 20 to the wheelchair frame 88. The wheelchair footrest moving device 20 includes a rotating cam member with edge cam faces 22, 24 including the first ends 23 and 25 suported by an extended structure 26 that is attached to a bracket 28 which includes supporting structures 30 and 32 for the wheelchair footrest assembly attachment posts 34 and 35 that is also the rotational axis 38 and the location of the bore holes 40 and 42 of the wheelchair footrest moving device 20. The device is powered by the rotation of an operation means 44 which is attached to a location 46 parallel to the axis of rotation 38 located in the center of the attachment posts 34 and 35. The point of contact 58 for moving the wheelchair footrest assembly 48 to the front 52 of the wheelchair 56 is located at the end of the bracket 28 at an end closest to the attachment and supporting structure 30. The position of the wheelchair footrest assembly 48 in front of the wheelchair 56 is indicated. The wheelchair 56 and a portion of the wheelchair frame 88 is shown with the brackets 90 and 94 and attachment posts 34 and 35. The footrest assembly 48 shows the bracket 62 with contact point 66. The latching device 70 is shown with the contact surface 78.

Figure 4:
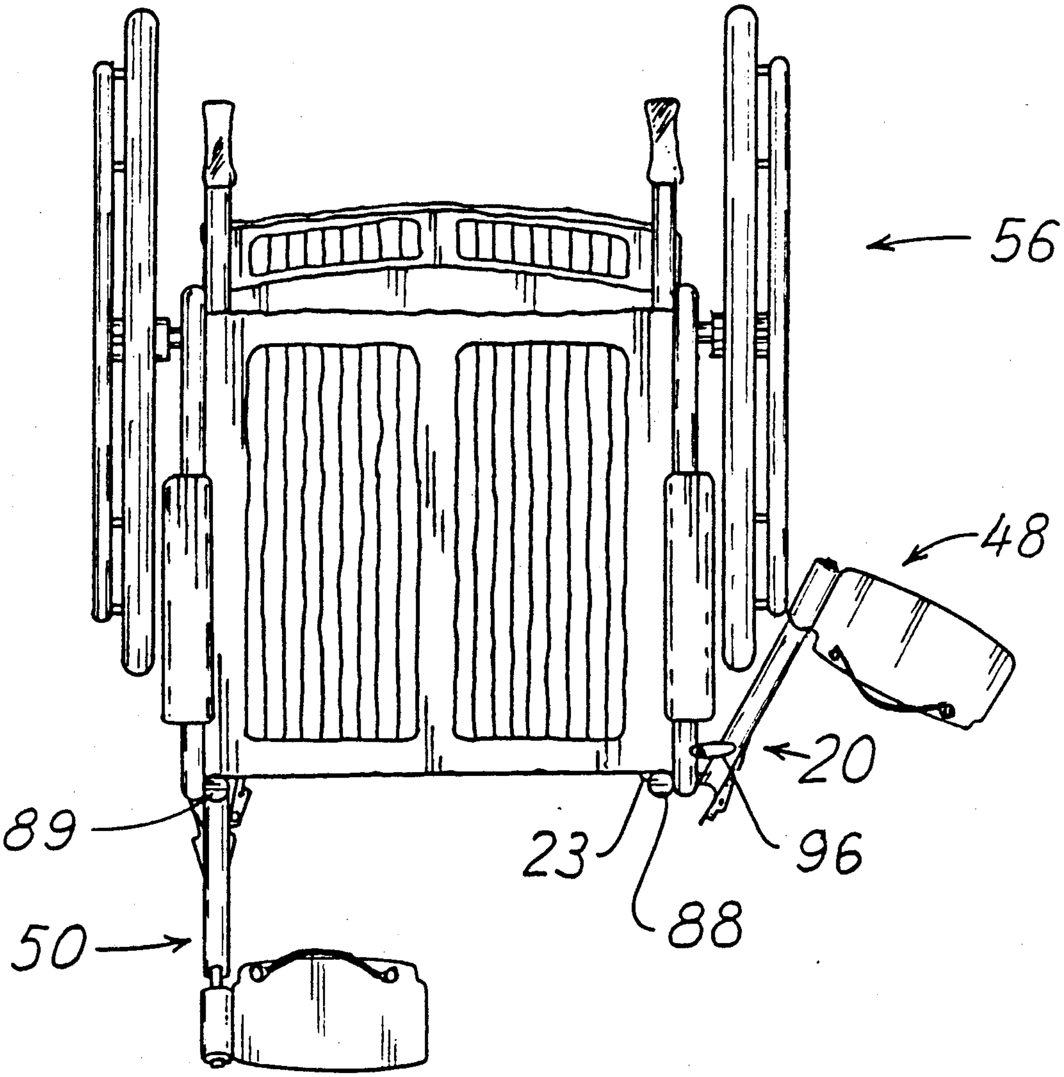
FIG. 4 is an overhead view of the device in FIG. 2 with the wheelchair left footrest moved to the left side of the wheelchair.

FIG. 4 is a overhead view of the wheelchair chair 56, the left 48 wheelchair footrest assembly is at the side, the right 50 wheelchair footrest assembly is in front. The wheelchair footrest moving device 20 is in position on the left side of the wheelchair 56 with the first end 23 of the cam member 26 showing beside the wheelchair frame 88. To return the footrest to the front of the wheelchair force is applied in a rotational manner by the operator means 44 which causes the wheelchair footrest assembly 48 to move toward a latched position in front of the wheelchair 56.

Figure 5:
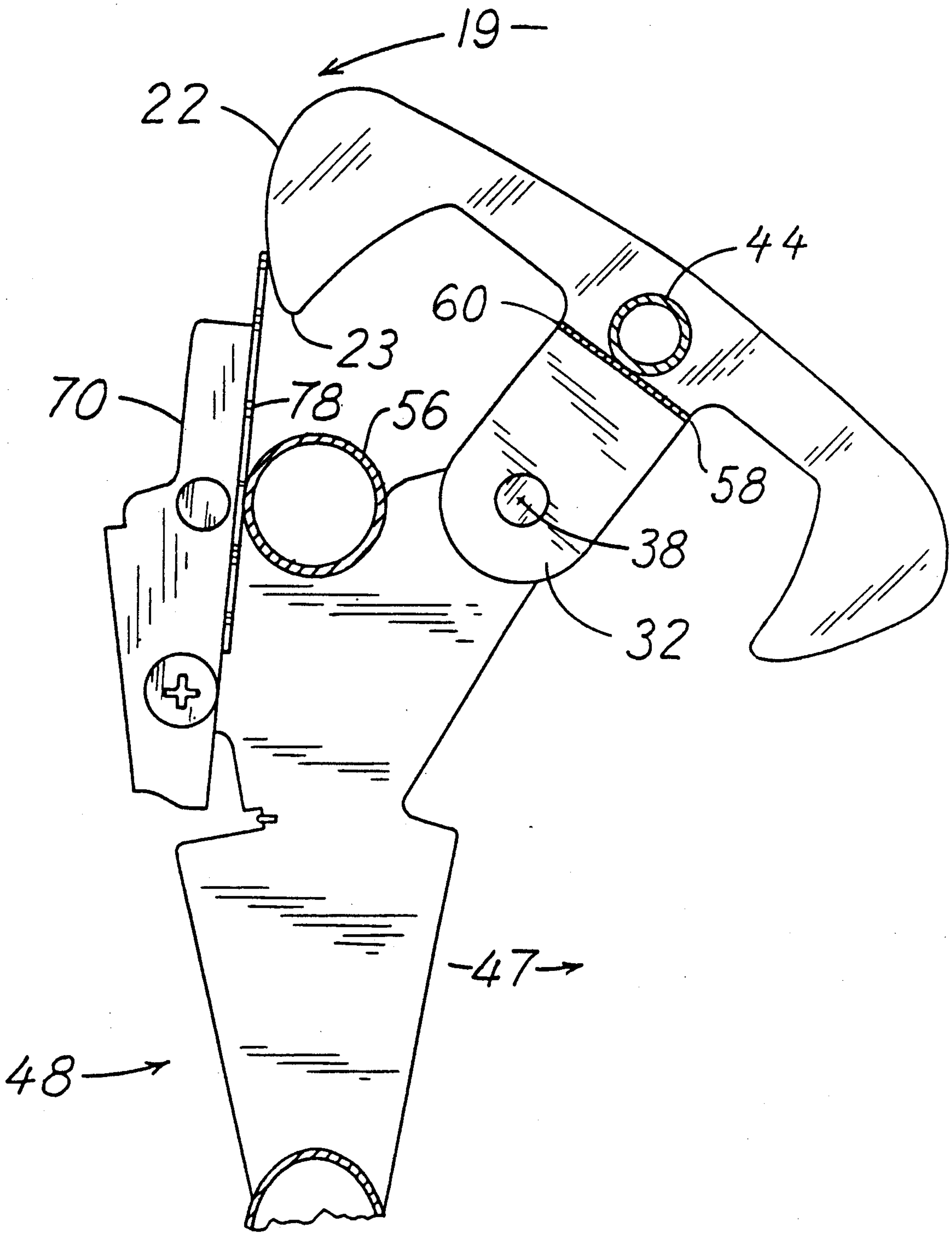
FIG. 5 is a partial cross sectional view designated 5—5 in FIG. 3 from the top of a left wheelchair footrest assembly, a portion of the wheelchair frame, and a cross sectional view of the wheelchair footrest moving device in position to move the latching device to the release position on the wheelchair footrest assembly.
Figure 6:
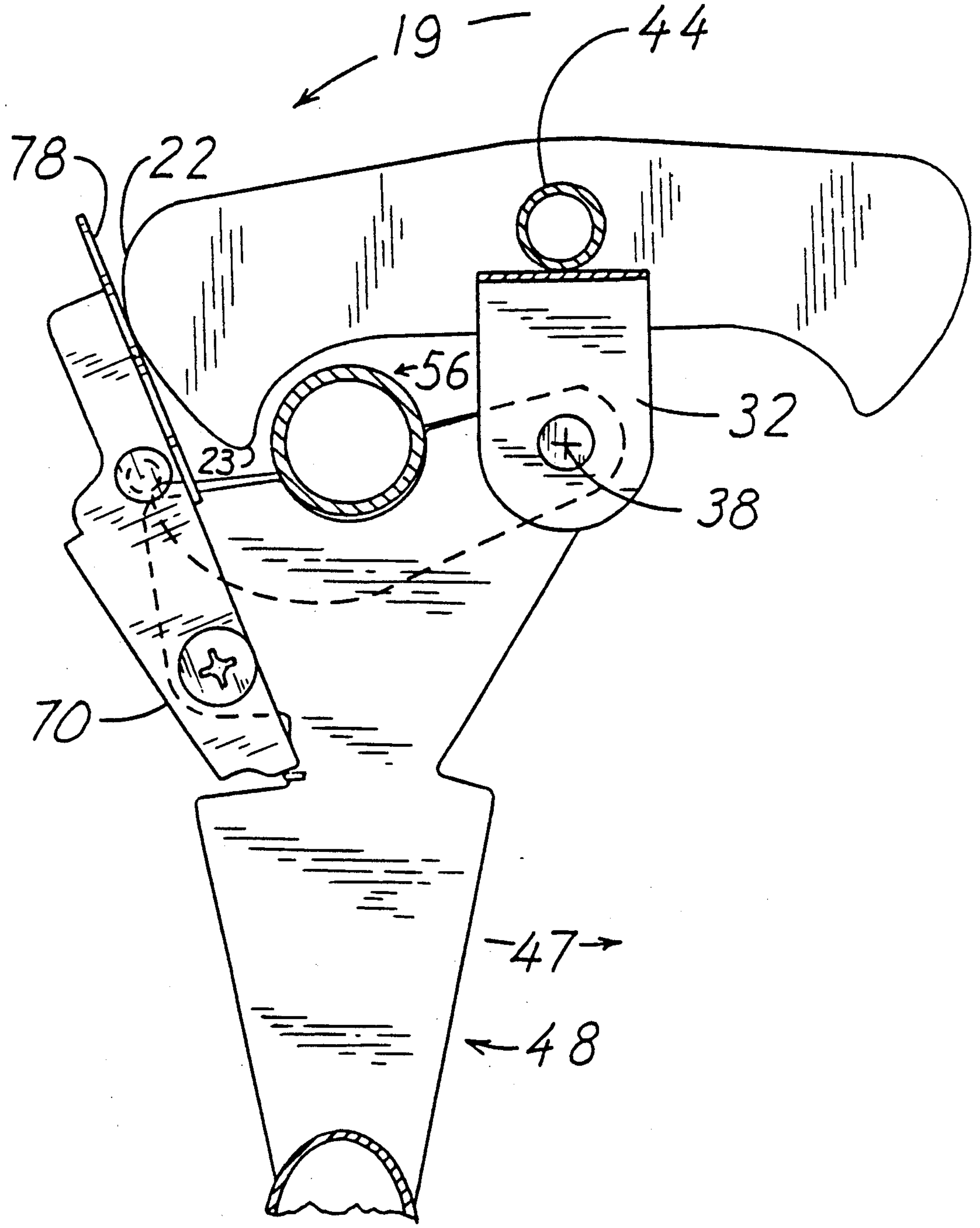
FIG. 6 is a partial cross section of the device as shown in FIG. 5 in the position to begin releasing the latching device on the wheelchair footrest.
Figure 7:
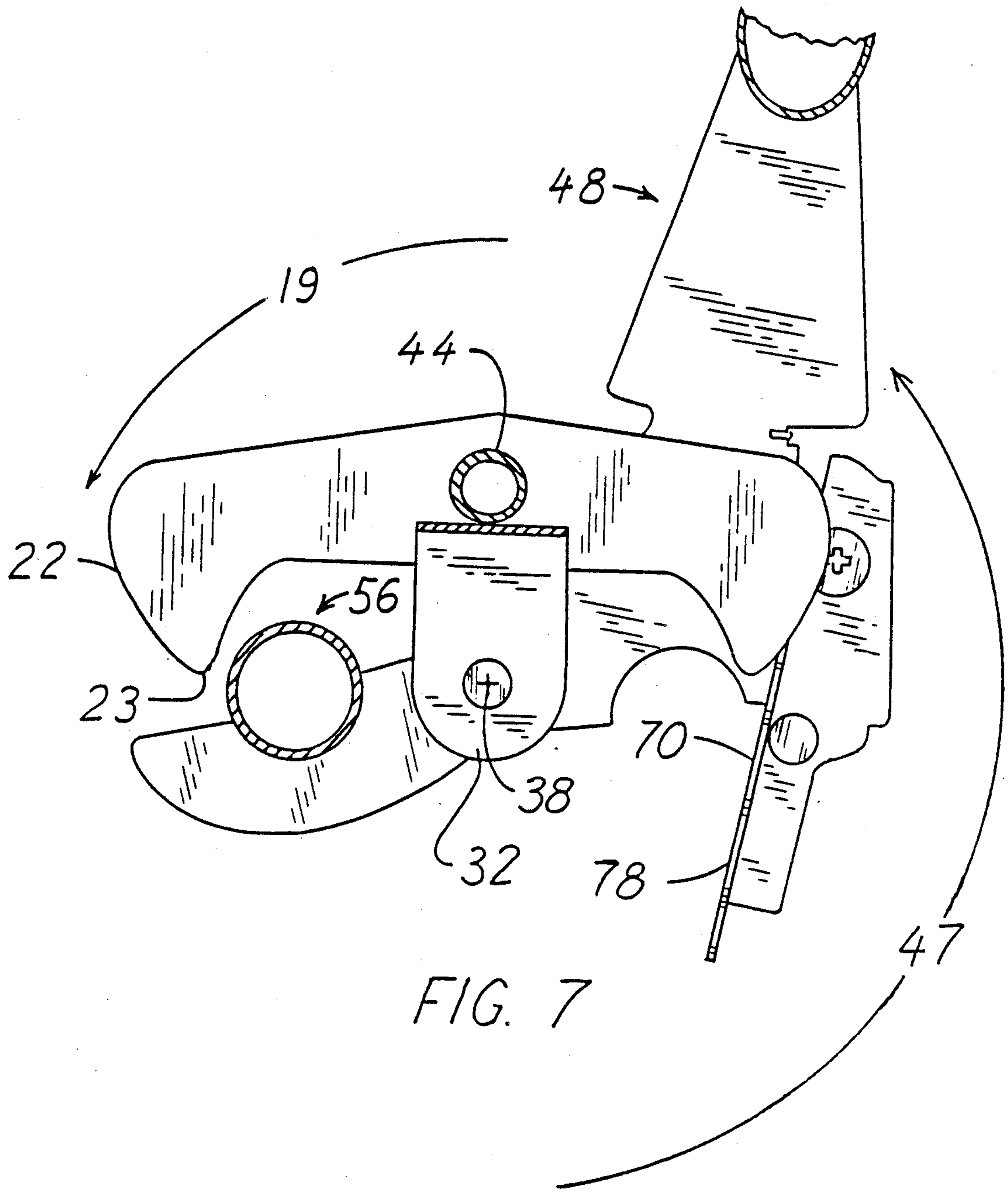
FIG. 7 is a partial cross section of the device shown in FIG. 5 in the open position with the wheelchair footrest assembly rotated fully to the side of the wheelchair.

FIGS. 5, 6 and 7 are detailed (but partial) cross sectional views designated 5—5 in FIG. 3 of the means to rotate in the direction 47 the wheelchair footrest assembly 48 from a position in front of the wheelchair 56 to the side of the wheelchair 56. Applying force to the operator means 44 will cause the device 20 to rotate in the direction 19 about the axis of rotation 38 the first end 23 of the camming surface 22 to contact surface 78 as shown in FIG. 5 on the latch handle 70 causing the latch to open which in turn allows the sliding of the contact surface 78 away from the camming surface 22 as shown in FIG. 6 and with continued force causes the wheelchair footrest assembly 48 to be in position at the side of the wheelchair 56 as shown in FIG. 7.

Figure 8:
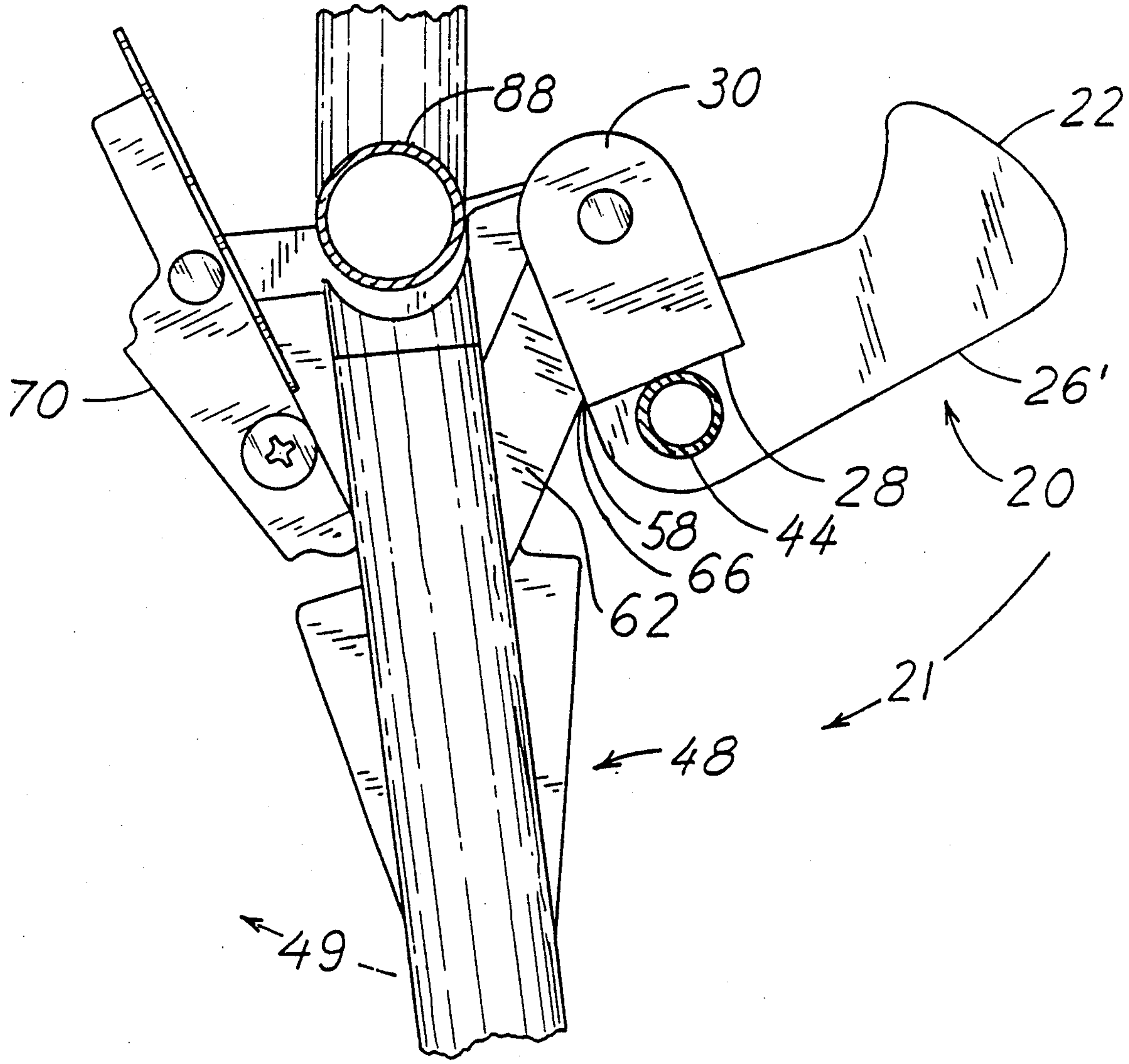
FIG. 8 is a view from the top of a section designated 8—8 in FIG. 3, but with an alternate embodiment of the cam member, of a left wheelchair footrest assembly, a cross section of the wheelchair frame, and a top view of the left only wheelchair footrest moving device with an alternate cam member in position to finish rotating the frame of the wheelchair footrest from the side of the wheelchair to the latched position in front of the wheelchair.
Figure 9:
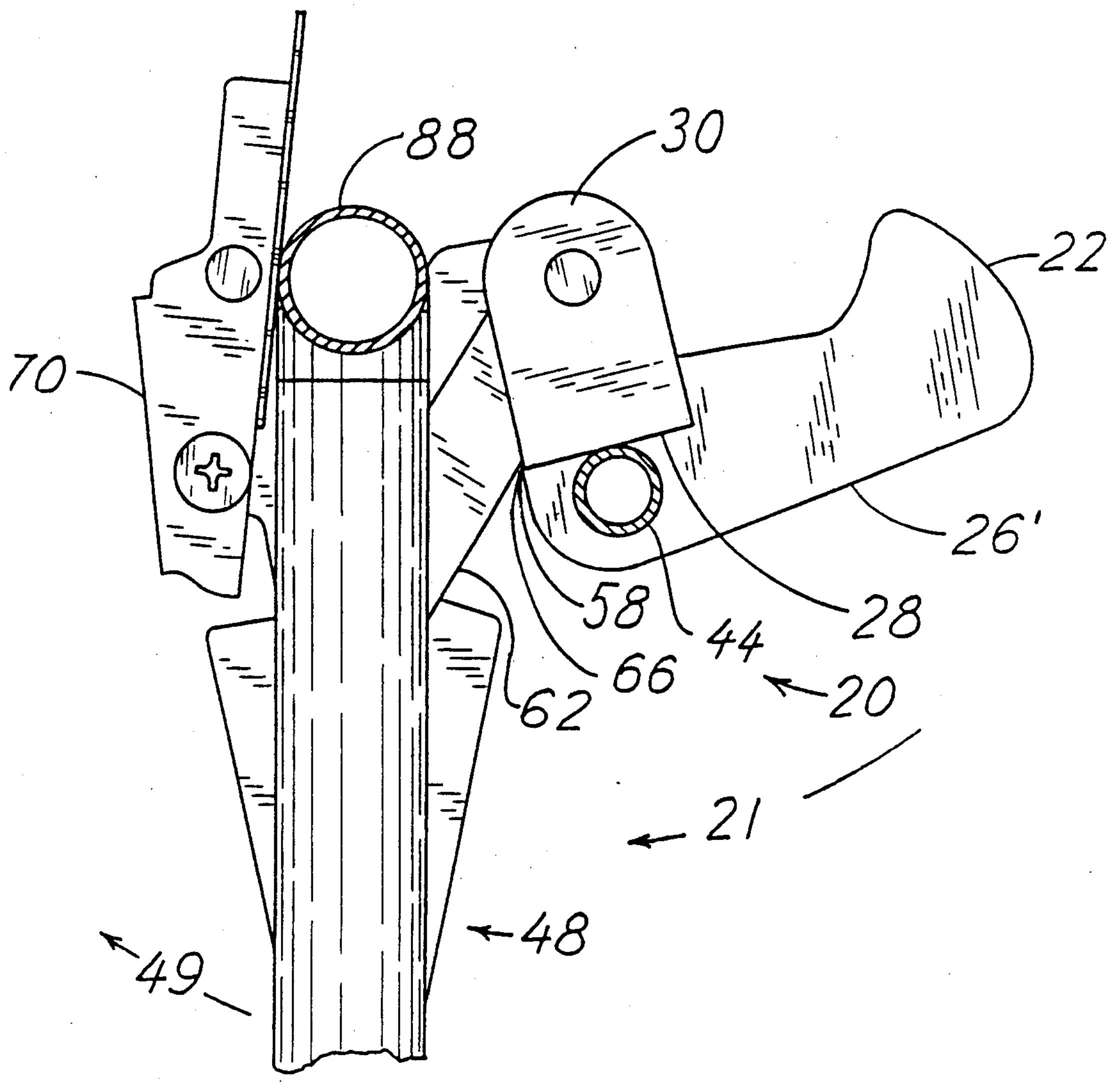
FIG. 9 is the device as shown in FIG. 8 in position after rotating the frame of the wheelchair footrest from the side of the wheelchair to the latched position in front of the wheelchair.

FIGS. 8, and 9 are detailed views of a section designated 8—8 in FIG. 3 but with an alternate cam member 26′ having only a single edge cam 22 of the means to complete the positioning of the wheelchair footrest assembly 48 in front of the wheelchair 56 from the side of the wheelchair. Force is applied in a rotational manner 21 by the operator means 44 which causes the contact point 58 on the bracket 28 near supporting structure 30 of the wheelchair footrest moving device 20″ to contact point 66 on bracket 62 of the wheelchair footrest assembly 48 to cause the wheelchair footrest assembly 48 to move in the direction designated 49 from the side of the wheelchair toward a latched position in front of the wheelchair 56 as shown in FIG. 8. Continuing application of force in this manner will cause the latching device 70 to latch the wheelchair footrest assembly 48 in a normal latched position in front of the wheelchair 56 as shown in FIG. 9.

Figure 10:
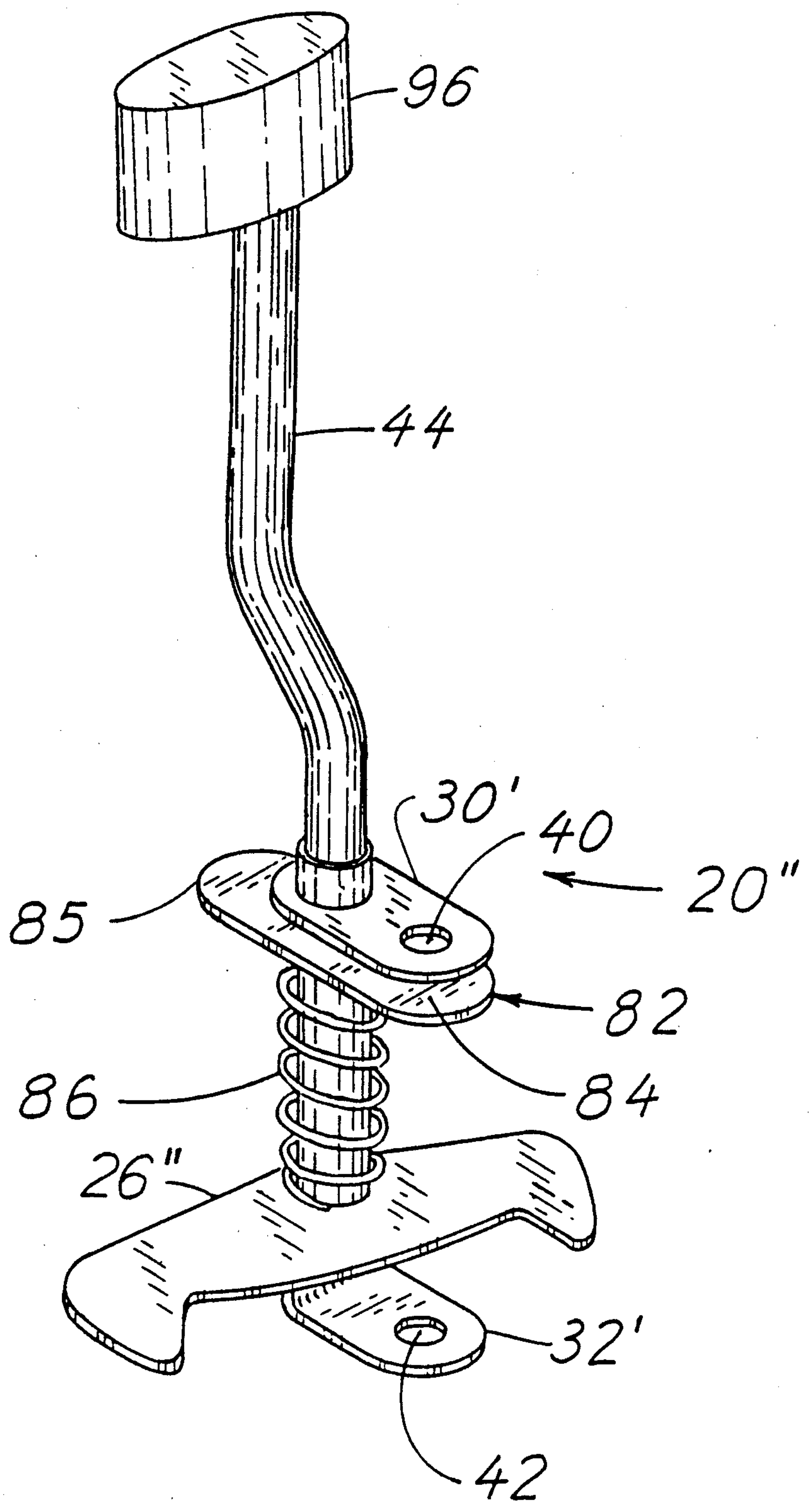
FIG. 10 is a perspective view of another embodiment of the wheelchair footrest moving device including the securing device positioned for use on the right side of the wheelchair.
Figure 11:
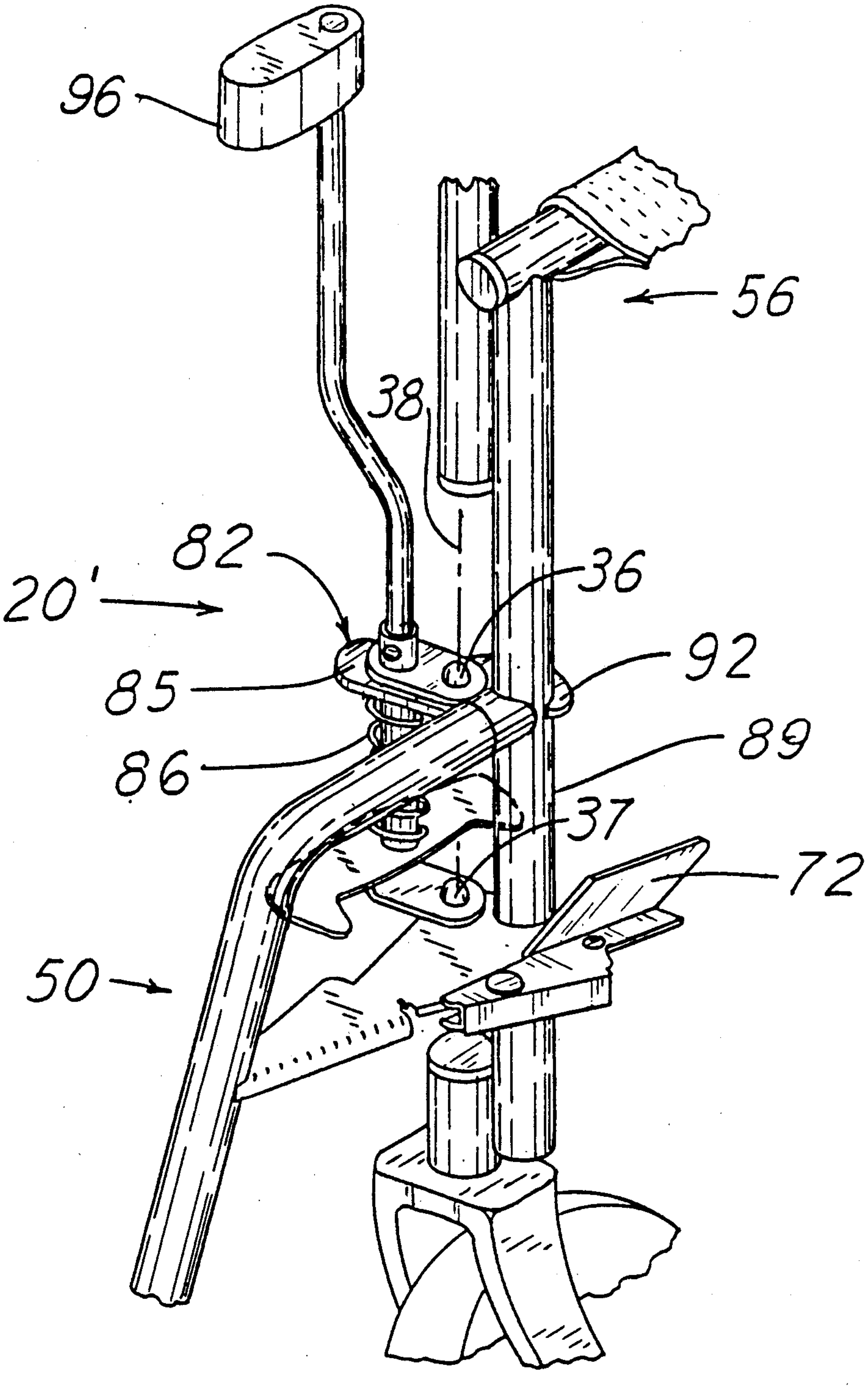
FIG. 11 illustrates the device as shown in FIG. 10 attached to a portion of the wheelchair frame and wheelchair footrest assembly for use on the right side of the wheelchair.

FIGS. 10 and 11 are perspective views of another embodiment of the wheelchair footrest moving device 20″ including the securing device 82 positioned for use on the right side of the wheelchair. FIG. 11 illustrates a portion of the wheelchair frame 89 and the wheelchair footrest moving device 20″ in place. The securing device 82 has an engaging latch 84, an extension 86 for ease of operation and a spring 86. The securing device 82 when necessary will permit the removal of the wheelchair footrest moving device 20″ from the wheelchair 56 and the wheelchair footrest assembly 50. The securing device 82 has an engaging latch 84 that makes contact just under the bracket 92 extending from the wheelchair frame 89 in the general vicinity of the axis of rotation 38 and the wheelchair footrest assembly attachment post 36. The wheelchair frame 89 also has the wheelchair footrest assembly attachment post 37 and an attached lower bracket that is not shown. The above described operation of the device 20″ to transmit forces in either axial direction is accomplished very conveniently and remotely of the environment of device 20″ through the use of a simple and effective operator means 44.

This device can be used in other applications where it is desirable to operate a latching device or perform a rotating motion from a remote location.

Although particular embodiments of the invention have been described in the forgoing detailed description, it will be understood that the device is capable of numerous rearrangements, substitutions and modifications of parts without departing from the scope of the invention as set forth in the claims below.

What is claimed is:

1. A device for remotely operating a wheelchair footrest means that is pivotally supported on a pair of spaced-apart, upwardly-directed, and vertically-aligned attachment posts on a forward leg of a wheelchair so as to be moveable from a position in front of said wheelchair to a position at the side of said wheelchair, said footrest means provided with a latching means including a latch release means for releasably latching said footrest means in said position in front of said wheelchair, said device comprising:

bracket means having substantially parallel supporting structures at opposite ends of said bracket means, said supporting structures spaced apart a distance corresponding to a spacing between said attachment posts on said wheelchair, said supporting structures each provided with a hole for engagement with one of said attachment posts whereby said bracket means is permitted to rotate about an axis established by said aligned attachment posts;

operator means having a first end connected to said bracket means and a distal end proximate an armrest of said wheelchair, said operator means providing for rotation of said bracket means about said axis; and an elongated cam member attached to said bracket means for rotation therewith, said cam member being oriented substantially perpendicular to said axis, said cam member having an edge cam surface extending a distance from said bracket means whereby said edge cam surface contacts and operates said latch release means of said footrest means when said bracket means is rotated by said operator means in one direction to thereby unlatch said footrest means and rotate said footrest means to said side of said wheelchair.

2. The device of claim 1 wherein said bracket means is provided with a contact surface for engaging said footrest means when said bracket means is rotated in a second direction by said operator means to move said footrest means from said side of said wheelchair to said position in front of said wheelchair to engage said latching means of said footrest means.

3. The device of claim 1 wherein said bracket means is provided with a hollow sleeve oriented substantially parallel with said axis to receive said first end of said operator means.

4. The device of claim 3 further comprising a releasable securing device associated with at least one of said supporting structures of said bracket means for engagement with a bottom portion of a support for one of said attachment posts on said wheelchair to prevent inadvertent disengagement of said holes of said supporting structures from said attachment posts.

5. The device of claim 4 wherein said securing device is provided with a hole to accept said hollow sleeve, said securing device adapted to rotate around an axis of said hollow sleeve, and further comprising a spring means coaxial with said hollow sleeve to bias said securing device against said bottom portion of said attachment post.

6. The device of claim 1 wherein said distal end of said operator means is provided with means proximate said arm of said wheelchair to facilitate rotation of said operator means by a user of said wheelchair.

7. The device of claim 1 wherein said cam member is provided with oppositely disposed first and second edge cam surfaces whereby said device is usable for either of right and left footrest means of said wheelchair, said first edge cam surface for contact with said latch release means of said right footrest means when said device is mounted on a right side of said wheelchair, and said second edge cam surface for contact with said latch release means of said left footrest means when said device is mounted on a left side of said wheelchair.

8. A device for remotely operating a wheelchair footrest means that is pivotally supported on a pair of spaced-apart, upwardly-directed, and vertically-aligned attachment posts on a forward leg of a wheelchair so as to be movable from a position in front of said wheelchair to a portion at the side of said wheelchair, said footrest means provided with a latching means including a latch release means for releasably latching said footrest means in said position in front of said wheelchair, said device comprising:

bracket means having substantially parallel supporting structures extending at opposite ends of said bracket means, said supporting structures spaced apart a distance corresponding to a spacing between said attachment posts on said wheelchair, said supporting structures each provided with a hole for engagement with one of said attachment posts whereby said bracket means is permitted to rotate about an axis established by said aligned attachment posts, said bracket means provided with a hollow sleeve extending between said opposite ends;

a releasable securing device associated with at least one of said supporting structures for engagement with a bottom portion of a support for one of said attachment posts on said wheelchair to prevent inadvertent disengagement of said holes of said supporting structures from said attachment posts;

operator means having a first end inserted into and connected to said hollow sleeve of said bracket means, and a distal end proximate an armrest of said wheelchair, said operator means providing for rotation of said bracket means about said axis established by said attachment posts; and an elongated cam member attached to said bracket means for rotation wherewith, said cam member being oriented substantially perpendicular to said axis, said cam member having an edge cam surface extending a distance from said bracket means whereby said edge cam surface contact and activates said latch release means of said footrest means when said bracket means is rotated by said operator means in one direction to thereby unlatch said footrest means and rotate said footrest means to said side of said wheelchair.

9. The device of claim 8 wherein said bracket means is provided with a contact surface for engaging said footrest means when said bracket means is rotated in a second direction by said operator means to move said footrest means from said side of said wheelchair to said position in front of said wheelchair to engage said latching means of said footrest means.

10. The device of claim 8 wherein said securing device is provided with a hole to accept said hollow sleeve, said securing device adapted to rotate around an axis of said hollow sleeve, and further comprising a spring means coaxial with said hollow sleeve to bias said securing device against said bottom portion of said attachment post.

11. The device of claim 8 wherein said cam member is provided with oppositely disposed first and second edge cam surfaces whereby said device is usable for either of right and left footrest means of said wheelchair, said first edge cam surface for contact with said latch release means of said right footrest means when said device is attached to a right side of said wheelchair, and said second edge cam surface for contact with said latch release means of said left footrest means when said device is attached to a left side of said wheelchair.

12. A device for remotely operating one of a first and a second wheelchair footrest means that are pivotally supported on a pair of spaced-apart, upwardly-directed and vertically-aligned attachment posts on forward legs of a wheelchair so as to be moveable from a position in front of said wheelchair to a position at the side of said wheelchair, said footrest means provided with a latehing means including a latch release means for releasably latching said footrest means in said position in front of said wheelchair, said device comprising:

bracket means having a pair of substantially parallel supporting structures, one of said supporting structures positioned proximate each of opposite ends of said bracket means, said supporting structures spaced apart a distance corresponding to a spacing between said attachment posts on said wheelchair, said supporting structures each provided with a hole for engagement with one of said attachment posts whereby said bracket means is permitted to rotate about an axis extablished by said aligned attachment posts;

a hollow sleeve attached to said bracket means extending substantially between said opposite ends of said bracket means and oriented substantially parallel with said axis of rotation;

operator means having a first end received in and connected to said hollow sleeve, and a distal end proximate an armrest of said wheelchair, said operator means providing for rotation of said bracket means about said axis of rotation;

handle means attached to said distal end of said operator means proximate said armrest of said wheelchair to facilitate rotation of said operator means by a user of said wheelchair; and an elongated cam member attached to said bracket means for rotation wherewith, said cam member being oriented substantially perpendicular to said axis, said cam member having oppositely disposed first and second edge cam surfaces, said edge cam surfaces extending a distance from said bracket means whereby when said device is mounted to operate said first footrest means, said first edge cam surface contacts and activates said latch release means of said first footrest means when said bracket means is rotated by said operator means in one direction to thereby unlatch said first footrest means and rotate said first footrest means to said side of said wheelchair, and when said device is mounted to operate said second footrest means, said second edge cam surface contacts and activates said latch release means of said second footrest means when said bracket means is rotated by said operator means to thereby unlatch said second footrest means and rotate said second footrest means to an opposite side of said wheelchair.

13. The device of claim 12 wherein said bracket means is provided with oppositely disposed first and second contact surfaces whereby when said device is mounted to operate said first footrest means, said first contact surface contacts said first footrest means to return said first footrest means to said position in front of said wheel chair when said bracket means is rotated in a direction opposite that to unlatch said first footrest means, and whereby when said device is mounted to operate said second footrest means, said second contact surface contacts said second footrest means to return said second footrest means to said position in front of said wheelchair when said bracket means is rotated in a direction opposite that to unlatch said second footrest means.

14. A device for remotely operating one of a first and a second wheelchair footrest means that are pivotally supported on a pair of spaced-apart, upwardly-directed, and vertically-aligned attachment posts on forward legs of a wheelchair so as to be movable from a position in front of said wheelchair to a position at the side of said wheelchair, said footrest means provided with a latching means including a latch release means for releasably latching said footrest means in said position in front of said wheelchair, said device comprising:

bracket means having a pair of substantially parallel supporting structures, one of said supporting structures positioned proximate each of opposite ends of said bracket means, said supporting structures spaced apart a distance corresponding to a spacing between said attachment posts on said wheelchair, said supporting structures each provided with a hole for engagement with one of said attachment posts whereby said bracket means is permitted to rotate about an axis extablished by said aligned attachment posts;

a hollow sleeve attached to said bracket means extending substantially between said opposite ends of said bracket means and oriented substantially parallel with said axis of rotation;

operator means having a first end received in and connected to said hollow sleeve, and a distal end proximate an armrest of said wheelchair, said operator means providing for rotation of said bracket means about said axis;

handle means attached to said distal end of said operator means proximate said armrest of said wheel chair to facilitate rotation of said operator means by a user of said wheelchair;

an elongated cam member attached to said bracket means for rotation wherewith, said cam member being oriented substantially perpendicular to said axis, said cam member having oppositely disposed first and second edge cam surfaces, said edge cam surfaces extending a distance from said bracket means whereby when said device is mounted to operate said first footrest means, said first edge cam surface contacts and activates said latch release means of said first footrests means when said bracket means is rotated by said operator means in one direction to thereby unlatch said first footrest means and rotate said first footrest means to said side of said wheelchair, and when said device is mounted to operate said second footrest means, said second edge cam surface contacts and activates said latch release means of said second footrest means when said bracket means is rotated by said operator means to thereby unlatch said second footrest means and rotate said second footrest means to an opposite side of said wheelchair: and a releasable securing device associated with at least one of said supporting structures of said bracket means for engagement with a bottom portion of a support for one of said attachment posts on said wheelchair to prevent inadvertent disengagement of said holes of said supporting structures from said attachment posts, said securing device provided with a hole to accept said sleeve attached to said bracket means to permit rotation of said securing device about said sleeve, and with a spring means coaxial with said sleeve to bias said securing device against said bottom portion of said attachment post.

* * * * *